United States Patent [19]
Guha

[11] Patent Number: 5,943,665
[45] Date of Patent: Aug. 24, 1999

[54] METHOD AND SYSTEM FOR PERFORMING CONCEPTUAL JOINS ACROSS FIELDS OF A DATABASE

[75] Inventor: Ramanathan V. Guha, Los Altos, Calif.

[73] Assignee: Netscape Communications Corporation, Mountain View, Calif.

[21] Appl. No.: 08/925,786

[22] Filed: Sep. 9, 1997

[51] Int. Cl.[6] .................................................. G06F 17/30
[52] U.S. Cl. .......................... 707/2; 707/3; 707/4; 706/61
[58] Field of Search .................... 707/2, 3, 4, 5, 707/102, 103; 706/61; 709/205, 217; 364/274, 276, 282

[56] References Cited

U.S. PATENT DOCUMENTS

| | | | |
|---|---|---|---|
| 5,325,466 | 6/1994 | Kornacker | 706/61 |
| 5,555,367 | 9/1996 | Premerlani et al. | 707/4 |
| 5,594,898 | 1/1997 | Dalal et al. | 707/2 |
| 5,696,960 | 12/1997 | Bhargava et al. | 707/2 |
| 5,734,887 | 3/1998 | Kingberg et al. | 707/4 |

*Primary Examiner*—Wayne Amsbury
*Assistant Examiner*—Thu-Thao Havan
*Attorney, Agent, or Firm*—Michael A. Glenn

[57] ABSTRACT

A method and system for performing a database join across a first field and a second field that represent a conceptual meaning, wherein the first field represents the conceptual meaning using a first value and the second field represents the conceptual meaning using a second value. The method and system includes mapping the first value and the second value to the conceptual meaning using a code-mapping table. After the code-mapping table is generated, the system receives a request that specifies a join operation between the first and second fields. The method and system further includes joining the first and second fields in response to identifying that the first and second fields map to the conceptual meaning in the code-mapping table.

10 Claims, 5 Drawing Sheets

```
       ---    -----    ------    ----
  S    S#     SNAME    STATUS    CITY
       ---    -----    ------    ----

S1     Smith      20      London
       S2     Jones      10      Paris
       S3     Blake      30      Paris
       S4     Clark      20      London
       S5     Adams      30      Athens ---    -----    -----    ------    -----
  P    P#     PNAME    COLOR    WEIGHT    CITY
       ---    -----    -----    ------    -----

P1     Nut      Red        12      London
       P2     Bolt     Green      17      Paris
       P3     Screw    Blue       17      Rome
       P4     Screw    Red        14      London
       P5     Cam      Blue       12      Paris
       P6     Cog      Red        19      London
```

*FIG. 2*

```
SELECT  S#, STATUS              SELECT  S.S#, S.STATUS
FROM    S                       FROM    S
WHERE   CITY = 'Paris' ;        WHERE   S.CITY = 'Paris' ;
```

*FIG. 3B*

```
            ---    ------
Result:     S#     STATUS
            ---    ------
            S2      10
            S3      30
```

*FIG. 3A*

```
SELECT  S#, SNAME; STATUS, S.CITY      /* or P.CITY */
        P#, PNAME, COLOR, WEIGHT
FROM    S, P
WHERE   S.CITY = P.CITY;
```

| S# | SNAME | STATUS | S.CITY | P# | PNAME | COLOR | WEIGHT |
|----|-------|--------|--------|----|-------|-------|--------|
| S1 | Smith | 20 | London | P1 | Nut   | Red   | 12 |
| S1 | Smith | 20 | London | P4 | Screw | Red   | 14 |
| S1 | Smith | 20 | London | P6 | Cog   | Red   | 19 |
| S2 | Jones | 10 | Paris  | P2 | Bolt  | Green | 17 |
| S2 | Jones | 10 | Paris  | P5 | Cam   | Blue  | 12 |
| S3 | Blake | 30 | Paris  | P2 | Bolt  | Green | 17 |
| S3 | Blake | 30 | Paris  | P5 | Cam   | Blue  | 12 |
| S4 | Clark | 20 | London | P1 | Nut   | Red   | 12 |
| S4 | Clark | 20 | London | P4 | Screw | Red   | 14 |
| S4 | Clark | 20 | London | P6 | Cog   | Red   | 19 |

*FIG. 4*

| S | S# | SNAME | STATUS | CITY |
|---|----|-------|--------|------|
|   | S1 | Smith | 20 | Lon |
|   | S2 | Jones | 10 | Prs |
|   | S3 | Blake | 30 | Prs |
|   | S4 | Clark | 20 | Lon |
|   | S5 | Adams | 30 | Ath |

| P | P# | PNAME | COLOR | WEIGHT | CITY |
|---|----|-------|-------|--------|------|
|   | P1 | Nut   | Red   | 12 | 02 |
|   | P2 | Bolt  | Green | 17 | 03 |
|   | P3 | Screw | Blue  | 17 | 04 |
|   | P4 | Screw | Red   | 14 | 02 |
|   | P5 | Cam   | Blue  | 12 | 03 |
|   | P6 | Cog   | Red   | 19 | 02 |

| FIELD_NAME | FIELD_VALUE | CONCEPTUAL_MEANING |
|---|---|---|
| S.CITY | Ath | The City Athens |
| P.CITY | 01 | The City Athens |
| S.CITY | Lon | The City London |
| P.CITY | 02 | The City London |
| | | |

*FIG. 7*

METHOD AND SYSTEM FOR PERFORMING CONCEPTUAL JOINS ACROSS FIELDS OF A DATABASE

CROSS-REFERENCE TO RELATED APPLICATIONS

The present application is related to application Ser. No. 08/925,632, entitled "Heuristic Co-identification of Objects Across Heterogeneous Information Sources", pending and application Ser. No. 08/929,352, entitled "A Pass-Through Architecture Via Hash Techniques to Remove Duplicate Query Results", pending filed on the same date as the present application and assigned to the assignee of the present application.

FIELD OF THE INVENTION

The present invention relates to database systems, and more particularly to a method and system for performing conceptual joins across fields of a database.

BACKGROUND OF THE INVENTION

A database system may be described as a computerized record keeping system whose overall purpose is to maintain information and to make that information available on demand. Almost all databases in use today are based on a "relational model" in which the database data is perceived by its users as a collection of tables. The tables in a relational database include a row of column names specifying one or more column fields, and zero or more data rows containing one scalar value for each of the column fields. Each column in a database stores data regarding a particular concept or object. Therefore, the value contained in each field in a column represents a separate instance of that concept. For example, a table pertaining to parts in a manufacturing database may contain a column representing the concept of part numbers, and each field in that column may contain a value representing one instance of part numbers.

One feature that distinguishes relational from nonrelational databases is the ability to "join" two or more tables. In general, a join is described as a query in which data is retrieved from the fields of more than one table (although data may also be retrieved by joining a table with itself). However, in some database environments, it is possible that column fields representing the same real-world concepts (e.g. cities or parts) in two different tables may not use the same field values to represent the same instances of those objects. There are several reasons why this is so. One reason has to do with the fact that table columns can support different data types, such as character strings, numeric data, and dates. Thus, even where two columns in different tables both support character strings to represent the same concepts or objects, the values used to fill those character strings may be different. For example, assume two columns represent types of transportation, such as automobiles, airplanes, trains etc. A field value representing the concept of automobile in one table may be the string "car", while a field value for automobile in another column may be the string "auto".

Another reason why column fields representing the same concepts in two different tables may have different field values is that the two columns have been designed to support different data types. For example one column representing types of transportation may do so with field values that are character strings, as described above, while another column represents the types of transportation with numeric codes, such as the code "50" to represent automobiles, the code "60" to represent airplanes, code "70" to represent trains, and so. In either of the examples above, if an attempt is made to perform a join across fields representing instances of the same concept but that use different field values, the join operation will fail because the sets of field values between the two columns do not equate. That is, although the field values "car", "auto", and the code "50" have the same meaning (automobile), the actual field values "car", "auto" and "50" do not equate and a join will fail.

Accordingly, what is needed is a method and system for performing joins across two or more fields that represent similar concepts using different field values. The present invention addresses such a need.

SUMMARY OF THE INVENTION

The present invention provides a method and system for performing a database join across a first field and a second field that represent a particular conceptual meaning, but where the first field represents the conceptual meaning using a first value and the second field represents the conceptual meaning using a second value. The method and system includes mapping the first value and the second value to the conceptual meaning using a code-mapping table. After the code-mapping table is generated, the system receives a request that specifies a join operation between the first and second fields. The method and system further comprises joining the first and second fields in response to identifying that the first and second fields map to the conceptual meaning in the code-mapping table. According to the system and method disclosed herein, the present invention enables two or more fields representing the same concept to be joined even when the fields expressing that concept use different field values.

BRIEF DESCRIPTION OF THE DRAWINGS

FIG. 2 is a diagram illustrating database tables in an example database.

FIGS. 3A and 3B are diagrams illustrating example Standard Query Language SELECT statements.

FIG. 4 illustrates a SQL query that includes a join operation, and the results returned by executing the query.

FIG. 5 is a diagram illustrating other examples of supplier and parts tables in which fields used to join the tables have different field values to represent similar concepts.

FIG. 7 is a diagram illustrating a field-code mapping table in accordance with the present invention.

DESCRIPTION OF THE INVENTION

Figure 1:
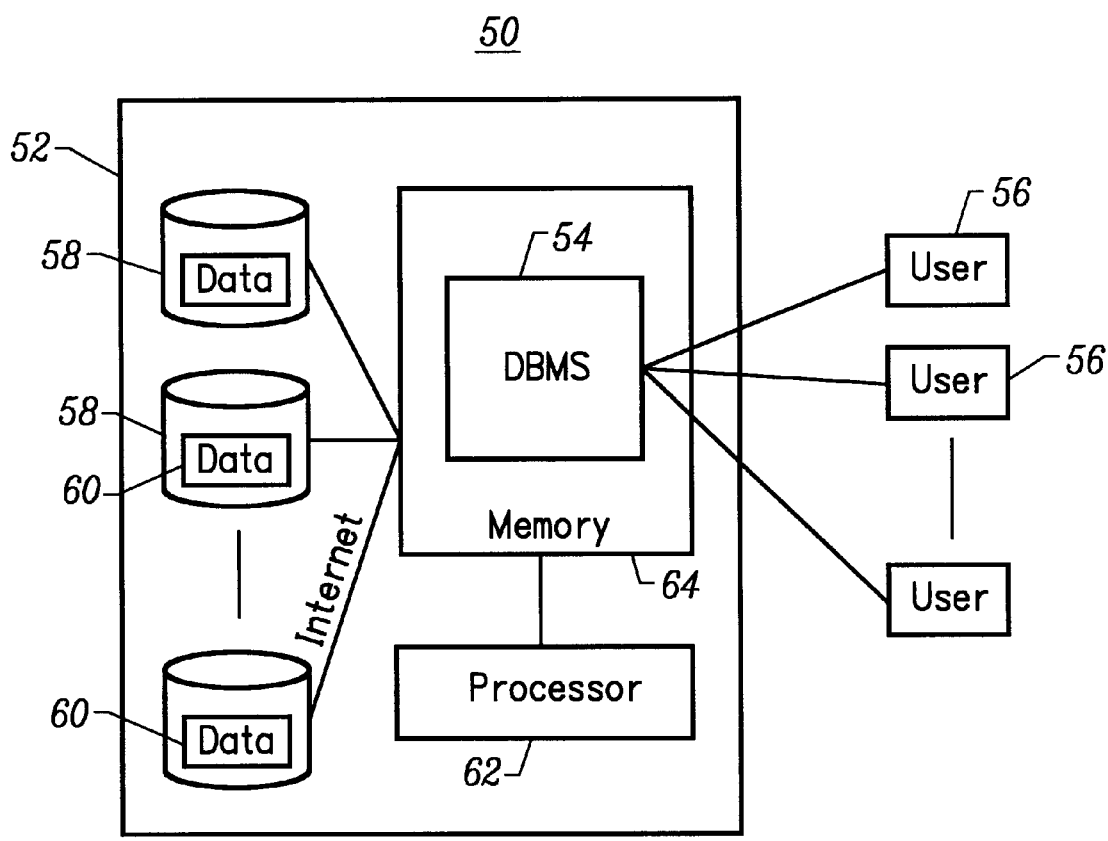
FIG. 1 is a block diagram of a relational database system environment in which the present invention operates.

The present invention relates to an improvement in relational database systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein. The present invention provides a method and system for performing joins across two or more fields that represent similar concepts using different Seld values. Although the present invention will be described in terms of a standard query language (SQL), as described in "An Introduction to Database Systems" by C. J. Date (Addison-Wesley Publishing Company, 5th ed. 1990), which is herein incorporated by reference, the present invention may be used and implemented with any type of database language S FIG. 1 is a block diagram of a relational database system environment in which the present invention operates. The database system 50 includes database hardware 52, database software 54, and users of the database 56. The database hardware 52 includes storage devices, typically hard disk drives 58, for storing database data 60, together with associated input/output devices, such as device controllers (not shown). A processor 62 and associated main memory 64 are used to support the execution of the database system software 54.

The database data 60 may be located in a central location and/or located remotely via a network, such as the Internet, for example. The database SO is based on the relational model in which the data SO is organized as a collection of tables. For 15 purposes of explanation, assume that the database SO is maintained by a manufacturing company to record information about its manufacturing projects, the parts used in those projects, and the suppliers who supply those parts. The projects, parts, suppliers, etc., thus constitute the basic entities or objects about which the company needs to record information.

FIG. 2 is a diagram illustrating two tables included in the example manufacturing supply database. The manufacturing-supply database includes a supplier table (S) where each row represents a different supplier, and a parts table (P) where each row represents a different part. Each column in the tables stores data regarding a particular concept or object. The S table includes columns representing a unique supplier number (S#), a supplier name (SNAME), a rating or status (STATUS); and a location (CITY). The P table includes columns representing a unique part number (P#), a part name (PNAME), a color (COLOR), a weight, and a location where parts of that type are stored (CITY). Therefore, the values contained in each field in a column represent a separate instance of these concepts. For example, the column (P#) in the parts table (P) represents the concept of part numbers, and each field in that column contains a value representing one instance of part numbers.

Referring again to FIG. 1, the database system software 54, hereinafter referred to as the database management system (DBMS), is the interface between the users 56 of the system and the physical database itself (i.e., the data 60 and the disk drives 58). The users 56 of the database 50 may be categorized in three broad classes: application programmers who are responsible for writing application programs that use the database 50, end-users who interact with the database 50 from on-line terminals, and database administrators (DBAs) who create and maintain the database 50 and who provide multiple end-users with security access to the database 50. If the database 50 is designed for a single-user, as opposed to multi-user database, then the end-user also performs the function of the DBA.

All request from users for access to the database data 60 are handled by the DBMS 54. The DBMS 54 thus shields the users 56 from hardware-level details of the database 50 by supporting database operations, such as adding files to the database, inserting data into existing files, updating files, deleting files, and retrieving data from existing files.

The DBMS 54 includes a built-in application, typically referred to as a query language processor, by which a user 56 is able to issue high-level commands or statements to the DBMS 54. Such commands include SELECr, INSERT, UPDATE and DELETE, which are examples of statements from the standard database language known as SQL (Structured Query Language). The SQL commands and queries are typically entered into the DBMS 54 through either a command-driven interface or through a menu-driven interface in which the user 56 is not required to enter commands, but instead fills in items on a form and chooses items from menus. As an example of a user query, assume that a user has the following request: "Find supplier numbers and 10 status for suppliers in Paris." The request may be expressed as a SQL SELECT statement, as illustrated in the following figures.

FIGS. 3A and 3B illustrate an example SQL query using the supplier-parts database. As shown in FIG. 3A, the SELECI~ command specifies the desired fields FROM a specified table WHERE some specified condition is true. When querying information from more than one table, a query must be formulated using qualified field names that comprise both the table name and the field name, separated by commas. FIG. 3B illustrates the query shown in FIG. 3A rewritten with qualified field names.

A query in which data must be retrieved from more than one table is called a "join" operation. For example, assume a user of the supplier-parts database has the following request: "Find all combinations of supplier and part information where both the supplier and the part are located in the same city." From the request, it can be seen that the required data must be obtained from two tables, S and P.

FIG. 4 illustrates the request above expressed as a SQL statement and the results returned by executing the query. In the SQL statement, both the S and P tables are named in the FROM clause. The connection between the two tables, that S.CITY=P.CITY, is called is the join condition and is expressed in the WHERE clause. As shown, the result of the query is a join of tables S and P over matching fields, in this case, CITY values.

In the supplier-parts example, the join condition is easily met because the field values contained in the CITY columns used to represent the same instances of real world concepts (e.g. the city London) are identical. However, in some database environments, it is possible that column fields representing the same concepts (e.g. cities or parts) in two different tables may not use the same field values to represent the same instances of those concepts.

This is generally due to the fact that not all databases are designed in the same manner, particularly when the databases are designed by completely separate entities. That is, table columns can be designed to support different data types, such as character strings, numeric data, and dates. As stated above, even where two columns in different tables both support character strings to represent the same concept or objects, the values used to fill those character strings may be different due to the use of synonyms and abbreviations.

For example, assume that the city column in the S table used abbreviations to represent the concept of cities, such as expressing the concept of the city of London as the string "Lon." If an attempt is made to join the S table with the P table, as shown in FIG. 4, the join condition will fail because the field values used to represent instances of the same concept (e.g., the city London) in the S.CITY and P.CITY columns do not equal one another. Although the field value "Lon" in S.CITY has the same meaning as the field value "London" in P.CITY, the actual field values "Lon" and "London" do not equate and the join will fail.

The column fields representing the same concepts in two different tables may also have different field values when the two columns have been designed to support different data types. For example, a column representing objects in a table in one database may support character strings, while a column representing those same objects in a table in another database may support numeric values.

In the supplier-parts database example, for instance, assume that the manufacturing company merged with another and that the two companies databases are merged either physically or over a network. Assume further that the supplier table S and the parts table P shown in FIG. 2 are replaced with the supplier table S and the parts table P from the new company, as shown in FIG. 5. The new S and P tables in FIG. 5 are similar to the old tables, but now the S table represents the concepts of cities with abbreviated character strings. And the P table represents the concepts of cities with numeric codes, rather than by names, where the following codes represent the following cities;

```
01 = Athens
02 = London
03 = Paris
  .   .
  .   .
  .   .
04 = Rome
```

As in the case of different character strings, the meanings of the field values being the same is not the same as the field values themselves being the same, and a join across the two fields will fail. For example, the field value "Lon" in S.CITY is not equal to the field value "02" in P.CITY even though they mean conceptually the same thing, the city of London. Also, in some systems, the join between a character field and a numeric field would not only fail, but would also result in an error because of the comparison between two incompatible data types.

Although a standardly written join condition will not work for the examples above, a modified join condition can be written that will successfully join the fields. In this method, the join condition is expanded to cover all possibilities between the respective field values. For example, to join the S and P tables in FIG. 5, the SQL join condition in FIG. 4 could be expanded as follows:

```
SELECT      *
FROM        S, P
``` where, the asterisk in the SQL statement is shorthand for a list of all field names in the table(s) named in the FROM clause.

This expanded SQL join is a "brute force" attempt at capturing the meaning of the concept of cities by specifying every combination of field values from the two columns that satisfy the condition city=city. Although the expanded join will perform its intended function, such a brute force method has several drawbacks. One drawback is that the expanded join is inefficient because each statement in the join clause must be executed every time a join between the two fields is attempted, which slows system performance. Another drawback is that the expanded join is inflexible. For example, if new cities are added to either table or if the city values are updated, the join will have to be rewritten in every program that uses that particular join operation.

The present invention provides a method and system for performing joins across two or more fields that represent similar concepts using different field values. According to the present invention, the fields are joined based on whether the field values represent the same concept, rather than whether the field values themselves are identical, as explained below.

Figure 6:
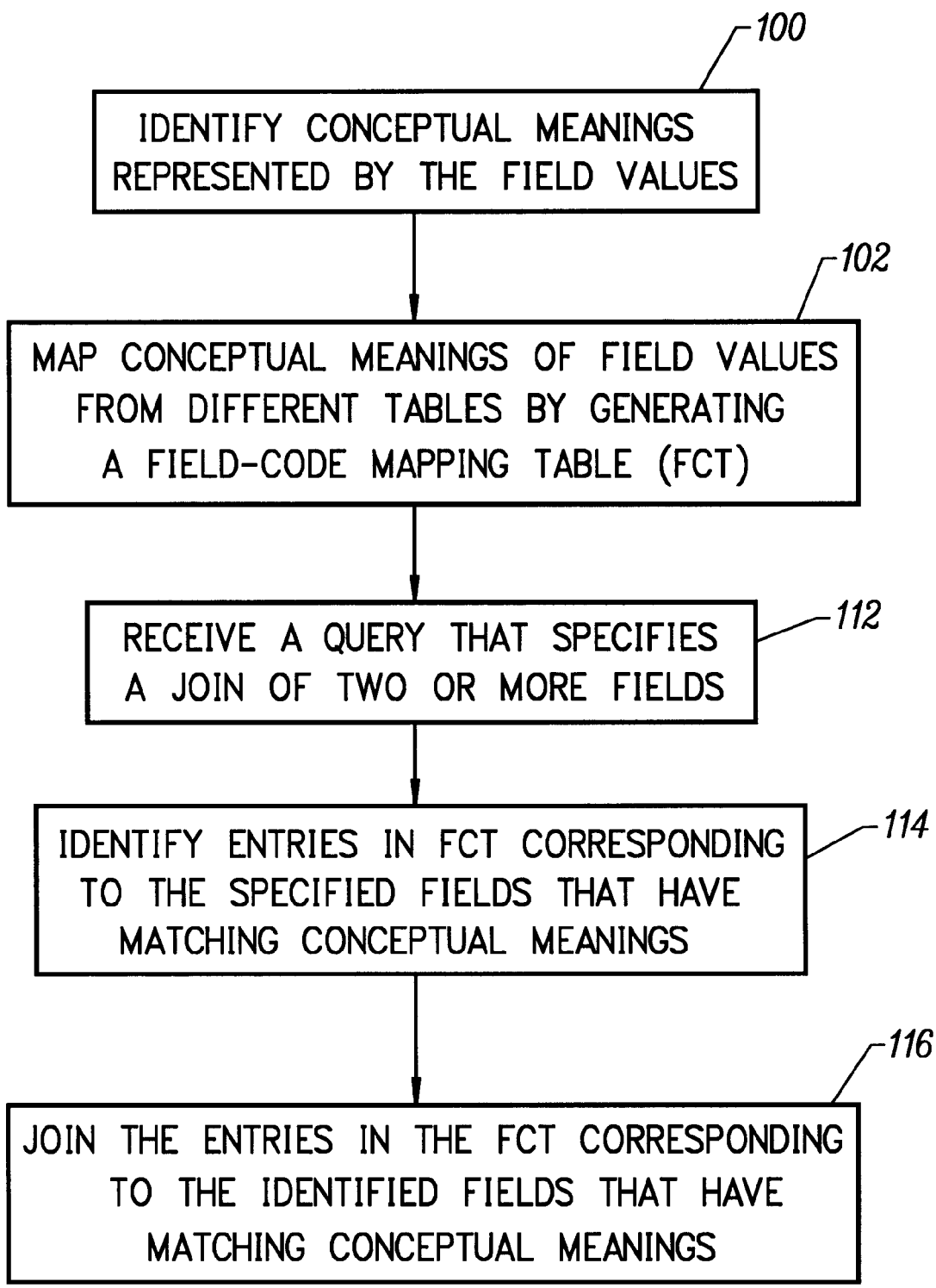
FIG. 6 is a flow chart of the method for performing conceptual joins in accordance with the present invention.

FIG. 6 is a flow chart of the method for performing conceptual joins in accordance with the present invention. The process begins by identifying the conceptual meanings represented by the field values of the fields that may be joined in the database in step 100. After the conceptual meanings of the field values are identified, the conceptual meanings of the field values from one table are mapped to the field values of other tables that represent the same concept in step 102. In a preferred embodiment, the mapping between the conceptual meanings of field values is implemented by generating a field-code mapping table.

FIG. 7 is a diagram illustrating a field-code mapping table in accordance with the present invention. According to the present invention, the field-code mapping table (FCT) 104 includes plurality of entries corresponding to the tables that may be joined in the database 50. Each of the entries in the FCT 104 includes a field_name 106, a field_value 108, and a conceptual_meaning 110 of the field value. The field_name 106 identifies a particular table and the name of a corresponding column from that table. The field value 108 specifies the actual field value used in the identified table, and the conceptual_meaning 110 is a generic term or phrase identifying what instance of a real world concept the field value represents. (In a preferred embodiment where the FCT 104 is implemented using SQL, the FCT column names include hyphens because the syntax rules of SQL do not allow spaces in table or column names).

The FCT 104 in FIG. 7 is shown with examples from the CITY columns of the supplier-parts database. The conceptual_meaning 110 in the first and second entries of the FCT identifies that the field values "ATM" and "01" in the tables S.CITY and P.CITY, respectively, both represent the concept of the city of Athens. In a preferred embodiment, the FCT 104 is created by a DBA, and once created, entries are added to the FCI 104 as needed for any new tables that are added to the database.

Referring again to FIG. 6, after the conceptual meanings of the field values are mapped to one another through the FCT 104, a database query is received from a user in step 112. The query specifies a join condition and therefore specifies two or more fields to be joined (e.g., fields F1 and F2). If the query is not in SQL form, then the fields to join may be manually identified by a DBA, or automatically identified by a software program. In response to receiving the request, the entries in the FCT 104 corresponding to the fields specified in the query that have matching conceptual meanings are identified in step 114. The entries in the FCT 104 corresponding to the fields having matching conceptual meanings are then joined using standard SQL in step 116.

In a preferred embodiment, steps 114 and 116 of joining the matching specified fields is performed by joining the FCT 104 with itself. Assuming the specified fields to be joined are F1 and F2, a conceptual join of fields F1 and F2 is performed through the FCT 104 using the following SQL:

```
FROM           FCT T1 FCT T.
```

WHERE
  T1.field name='F1' and
  T2.field_name='F2' and
  TI.conceptual_meaning=T2.conceptual_meaning and F1=T1.field_value and F2=T2.field_value As is apparent to those with ordinary skill in the art, when joining a table with itself, two rows of the table need to be referenced at the same time. In order to distinguish between the two references, SQL provides for the use of aliases or range variables (T1 and T2), each of which range over the FCT table. At any particular time, T1 represents some row from the first copy of the FCT, and T2 represents some row from the second copy. The result of the query is found by examining all possible pairs of T1'T2 values and checking the WHERE condition in every case. Joining the FCT with itself in this manner effectively performs a search of the FCT that co-identifies entries in the FCT that have matching conceptual meaning fields 110. Referring again to FIG. 7, for example, assume a query was received from a user specifying a join of the S.CITY and P.CITY fields. A conceptual join of these two fields is performed using the above SQL to join the FCT 104 with itself as follows:

| FROM | FCT T1 FCT T. |
|---|---|

WHERE

T1.field name='S.CITY' and

T2.field name='P.CITY' and

T1.conceptual_meaning=T2.conceptual_meaning and

S.CITY=T1.field value and

P.CITY=T2.field value and

Thus, all combinations of S.CITY and P.CITY will be found that represent the same conceptual city, but that express that concept using different field values. After a conceptual join of the FCT is complete, the remainder of the user's query may be processed in a conventional manner.

A method and system for conceptually joining fields that represent similar concepts using different field values has been disclosed. The conceptual join method and system of the present invention is both more efficient and has greater flexible than brute force methods. Software written according to the present invention is to be stored in some form of computer-readable medium, such as memory or CD-ROM, or transmitted over a network, and executed by a processor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer-implemented method for performing a database join across a first field and a second field that represent a conceptual meaning, wherein the first field represents the conceptual meaning using a first value and the second field represents the conceptual meaning using a second value that is different from the first value, the method comprising the steps of:

mapping the first value and the second value to the conceptual meaning using a code-mapping table;

receiving a request that specifies a join operation between the first and second fields; and joining the first and second fields in response to identifying that the first and second fields map to the conceptual meaning in the code-mapping table.

2. The invention of claim 1 wherein the first field is included in a first table, and the second field is included in a second table, further comprising the steps of:

providing the code-mapping table with a first entry and a second entry;

providing the first entry with a field name identifying the first table and the first field, a code field value specifying the first field value, and a field for specifying the conceptual meaning; and providing the second entry with a field name identifying the second table and the second field, a code field specifying the second field value, and a field for specifying the conceptual meaning.

3. The invention of claim 2, further comprising the step of:

identifying that the first and second field's map to the conceptual meaning by joining the code-mapping table with itself.

4. The invention of claim 3, further comprising the step of:

performing the join of the code-mapping table (CT) with itself to join the first field (F1) with the second field (F2) using table aliases T1 and T2 by executing a query:

| FROM | CT T1 CT T2 |
|---|---|

WHERE

T1.field_name='F1';

T2.field_name='F2';

T1.conceptual meaning=T2.conceptual_meaning;

F1=T1.field_value; and

F2=T2.field value.

5. A computer-implemented method for performing joins across a first and second field in a database, wherein the first and second fields represent a particular concept using different field values, the method comprising the steps of:

providing a code-mapping table, the code mapping table containing a plurality of entries corresponding to a plurality of fields in the database including the first and second fields, each of the plurality of entries including a field name of the field, the field value of the field, and a conceptual meaning represented by the field value;

receiving a request that specifies a join operation between the first field and the second field;

identifying entries in the code-mapping table corresponding to the first field and the second field that have matching conceptual meanings; and joining the first and second fields by generating a query language request that joins the fields corresponding to the identified entries in the code-mapping table.

6. The invention of claim 5, further comprising the step of:

identifying that the first and second fields have matching conceptual meanings by joining the code-mapping table with itself.

7. The invention of claim 6, further comprising the step of:

performing the join of the code-mapping table (CT) with the code-mapping table in order to join the first field (F1) with the second field (F2) using tables aliases T1 and T2 by executing a query:

| FROM | CT T1 CT T2 |
|------|-------------|

WHERE

T1.field_name='F1';

T2.field_name='F2';

T1.conceptual meaning=T2.conceptual_meaning;

F1=T1.field_value; and

F2=T2.field value.

8. A computer-readable medium containing program instructions for performing joins across a first and second field in a database, wherein the first and second fields represent a particular concept using different field values, the program instructions comprising the steps of:

providing a code-mapping table, the code mapping table containing a plurality of entries corresponding to a plurality of fields in the database including the first and second fields, each of the plurality of entries including a field name of the field, the field value of the field, and a conceptual meaning represented by the field value;

receiving a request that specifies a join operation between the first field and the second field;

identifying entries in the code-mapping table corresponding to the first field and the second field that have matching conceptual meanings; and joining the first and second fields by generating a query language request that joins the fields corresponding to the identified entries in the code-mapping table.

9. The invention of claim 8, further comprising the step of:

identifying that the first and second fields have matching conceptual meanings by joining the code-mapping table with itself.

10. The invention of claim 9, further comprising the step of:

performing the join of the code-mapping table (CT) with the code mapping table in order to join the first field (F1) with the second field (F2) using tables aliases T1 and T2 by executing a query:

| FROM | CT T1 CT T2 |
|------|-------------|

WHERE

T1.field_name='F1';

T2.field_name='F2';

T1.conceptual meaning=T2.conceptual_meaning;

F1=T1.field_value; and

F2=T2.field value.

\* \* \* \* \*